US008285557B2

(12) United States Patent
Sebestian et al.

(10) Patent No.: US 8,285,557 B2
(45) Date of Patent: *Oct. 9, 2012

(54) APPARATUS, SYSTEM AND METHOD FOR BUFFERING AUDIO DATA TO ALLOW LOW POWER STATES IN A PROCESSING SYSTEM DURING AUDIO PLAYBACK

(75) Inventors: Pradeep Sebestian, Beaverton, OR (US); Wayne Proefrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/857,687

(22) Filed: Aug. 17, 2010

(65) Prior Publication Data
US 2010/0312569 A1    Dec. 9, 2010

Related U.S. Application Data

(63) Continuation of application No. 11/537,480, filed on Sep. 29, 2006, now Pat. No. 7,778,838.

(51) Int. Cl.
 *G10L 21/00* (2006.01)
(52) U.S. Cl. ...... 704/500; 713/320; 713/324; 369/29.02
(58) Field of Classification Search .................. 704/500; 713/320, 324; 369/29.02
See application file for complete search history.

(56) References Cited

U.S. PATENT DOCUMENTS

| 5,675,808 | A | 10/1997 | Gulick et al. |
| 6,226,237 | B1 | 5/2001 | Chan et al. |
| 2005/0225364 | A1 | 10/2005 | Baker |
| 2006/0259642 | A1* | 11/2006 | Du et al. ........................ 709/247 |
| 2008/0307240 | A1 | 12/2008 | Dahan et al. |
| 2010/0030928 | A1* | 2/2010 | Conroy et al. .................. 710/23 |
| 2011/0031485 | A1* | 2/2011 | Kwak et al. .................... 257/40 |

OTHER PUBLICATIONS

Intel-Audio Codec '97, AC '97 Component Specification Revision 2.3 Rev 1.0, Apr. 2002, 108 pages.
Advanced Configuration and Power interface Specification, Revision 2.0b, Oct. 11, 2002, 502 pages.
High Definition Audio Specification, Revision 1.0 by Intel, Apr. 15, 2004, 174 pages.

* cited by examiner

*Primary Examiner* — Daniel D Abebe
(74) *Attorney, Agent, or Firm* — Kacvinsky Daisak, PLLC

(57) ABSTRACT

An audio data stream from a processing system may be buffered to allow low power states in the processing system during audio playback. An audio buffer may be provided external to the processing system and between the processing system and an audio codec. The audio buffer may also shift to an alternate audio data interface mode when the processing system is in the low power state. Of course, many alternatives, variations, and modifications are possible without departing from this embodiment.

20 Claims, 4 Drawing Sheets

APPARATUS, SYSTEM AND METHOD FOR BUFFERING AUDIO DATA TO ALLOW LOW POWER STATES IN A PROCESSING SYSTEM DURING AUDIO PLAYBACK

CROSS REFERENCE TO RELATED APPLICATION

This application is a continuation of U.S. patent application Ser. No. 11/537,480 filed on Sep. 29, 2008, entitled "APPARATUS, SYSTEM AND METHOD FOR BUFFERING AUDIO DATA TO ALLOW LOW POWER STATES IN A PROCESSING SYSTEM DURING AUDIO PLAYBACK".

FIELD

The present disclosure relates to playback of audio data from a processing system, and more particularly, relates to buffering audio data to allow low power system states in the processing system during audio playback.

BACKGROUND

Many existing computer systems include audio playback functionality. Computer systems may incorporate audio playback functionality into the processing system or subsystems. An audio codec (coder/decoder) may be used to convert digital audio data into an analog audio signal for playback by an audio device, such as speakers coupled to a computer. An audio controller may provide an interface between the audio codec and the processing components of the computer. In some computer systems, an audio controller may be included in the chipset of the processing system. The audio controller may send and receive audio data streams to and from the audio codec over an audio data link.

In some computer systems, particularly mobile computer systems, power management has become important. Power management may be accomplished by completely, or partially, shutting down computer components, such as the central processing unit (CPU), chipset, hard disk drive, display, and other input/output (I/O) devices, when the computer is not performing operations. A processing system, for example, may have a number of different power states, also known as sleep states. The processing system may operate in a high power state when it is actively being used and in a low power state during periods of relative inactivity. During low power states, the processing system (e.g., the CPU and/or chipset) may cease communications with and control of other resources. When an audio controller (e.g., within a chipset) is communicating with an audio codec, therefore, the processing system including the audio controller may be prevented from operating in a low power state.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
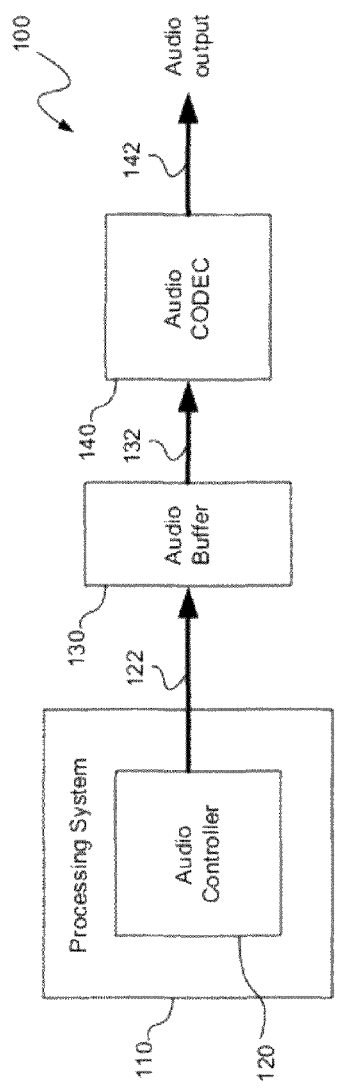
FIG. 1 is a schematic view of a system for buffering audio data to allow low power states during audio playback, consistent with one embodiment of the present disclosure.

Referring to FIG. 1, a system 100 may be used to buffer an audio data stream provided by a processing system 110 to allow low power states of the processing system 110 during audio playback. The system 100 may be used in any device capable of audio playback including, but not limited to, a desktop computer, a mobile computer, a handheld computer, and a digital media player.

The processing system 110 may include an audio controller 120 that controls one or more audio channels and the sending and/or receiving of digital audio data. The system 100 may also include an audio buffer 130 coupled to the audio controller 120 and an audio codec 140 coupled to the audio buffer 130. The audio buffer 130 receives at least one audio data stream 122 including audio data and/or control signals from the audio controller 120 and buffers the audio data stream(s). The audio buffer 130 may then transfer the buffered audio data stream(s) 132 to the audio codec 140. The audio codec 140 converts the buffered audio data stream(s) 132 into an audio output 142 for playback by an audio device (not shown). The audio buffer 130 may be external to the processing system 110 such that the audio buffer 130 effectively decouples the audio codec 140 and the processing system 110 and allows the processing system 110 to be placed into low power states during audio playback. As described in greater detail below, the audio buffer 130 may also be capable of shifting to an alternate audio data interface mode, for example, in response to the processing system 110 transitioning to a low power state.

The audio controller 120, the audio buffer 130 and the audio codec 140 use interfaces and protocols based on, at least in part, standardized digital audio architectures known to those skilled in the art. One example of a digital audio architecture is the Audio Codec '97 (AC '97) Architecture and Digital Interface (AC-link) described in the AC '97 Component Specification Revision 2.3 Revision 1, dated April 2002, published by Intel Corporation ("AC '97 Specification"). Another example of a digital audio architecture is the architecture described in the High Definition Audio Specification Revision 1.0, dated Apr. 15, 2004, published by Intel Corporation ("HD Audio Specification"). The audio controller 120, audio buffer 130 and the audio codec 140 may also support other serial pulse code modulation (PCM) audio data interfaces and protocols, such as inter-IC sound ($I^2S$), Left Justified, and Right Justified. The audio buffer 130 and the audio codec 140 may support multiple interfaces and protocols for the audio data in multiple audio data interface modes.

The processing system 110 may include one or more processors for processing data including audio data. In one embodiment, as will be described in greater detail below, the processing system 110 may include one or more central processing units (CPUs) and/or chipsets. As used herein, a low power state of the processing system 110 may be any state during which power is completely or partially shut down to one or more components of the processing system 110. In some embodiments, the processing system 110 may operate in accordance with the Advanced Configuration and Power Interface (ACPI) Specification Revision 2.0b (October, 2002). The ACPI Specification defines several power states: S0—fully operational and consuming the most power; S1—a low wake-up latency sleep state after which no system context (CPU or chipset) is lost; S2—a low wake-up latency sleep state after which processor and system cache context needs to be restored; S3—a low wake-up latency sleep state in which all context needs to be restored except for the system information stored in system memory; S4—lowest power, longest wake-up latency sleep state. A low power state may include any of the sleep states S1-S4 defined by the ACPI Specification.

Figure 2:
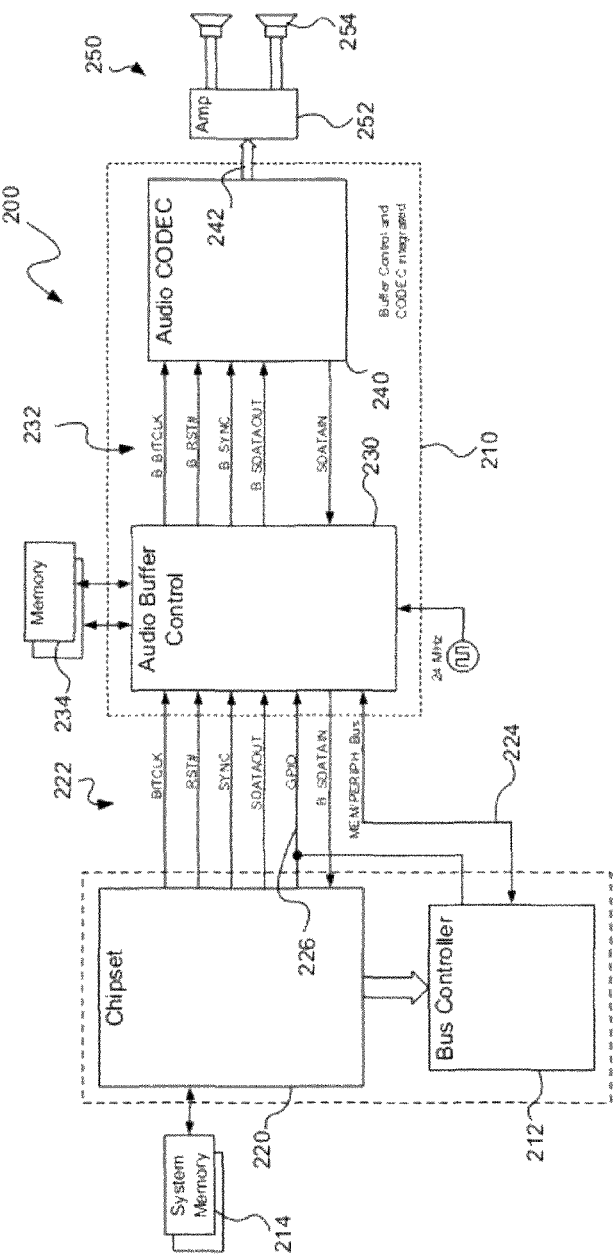
FIG. 2 is a schematic view of a system for buffering audio data to allow low power states during audio playback, consistent with another embodiment of the present disclosure.

According to one embodiment of a system 200, shown in FIG. 2, an audio controller may be integrated in a chipset 220. One example of a chipset 220 includes an Intel Hub Architecture (IHA) chipset including an input/output (I/O) controller hub (ICH) incorporating an audio controller compatible with the AC '97 Specification and/or the HD Audio Specification, such as the Intel I/O Controller Hub 7 (ICH7) Family. The chipset 220 may also be coupled to a system memory 214 to retrieve audio data from the system memory for formatting according to the appropriate digital audio protocol or interface (e.g., AC '97 or HD Audio). According to the HD Audio Specification, for example, the chipset 220 may include one or more direct memory access (DMA) engines configured to transfer digital audio data to and from system memory 214.

The system 200 may also include a buffered audio codec 210 that integrates an audio buffer control 230 and an audio codec 240. In one embodiment, the audio buffer control 230 and the audio codec 240 may be integrated as a single integrated circuit. The audio buffer control 230 and the audio codec 240 may also be separate components.

The audio buffer control 230 may be coupled to one or more memory devices 234 to control writing and reading of buffered audio data to and from the memory device(s) 234. The memory device(s) 234 may include Static Random Access Memory (SRAM), Dynamic Random Access Memory (DRAM), or other memory devices capable of temporarily storing audio data. The audio buffer control 230 may include circuitry to write and read the buffered audio data to and from the memory device(s) 234, for example, using direct memory access (DMA). The capacity and speed of the memory device(s) 234 and the width of the DMA channel(s) may vary depending upon the application, as will be recognized by those skilled in the art.

In one embodiment, the audio buffer control 230 may be coupled to the chipset 220 using a digital audio serial interface 222, such as an AC-Link compatible with the AC '97 Specification. The digital audio serial interface 222 may provide a clock signal (BITCLK), a reset signal (RST#), a frame synchronization signal (SYNC), a serial data out signal (SDATAOUT), and a serial data in signal (B_SDATAIN). The chipset 220 may provide one or more audio data streams over the digital audio serial interface 222, for example, using an AC-Link protocol compatible with the AC '97 Specification or using a HD audio protocol compatible with the HD Audio Specification. An AC-Link protocol, for example, handles input and output streams employing a time division multiplexed (TDM) scheme and provides for data transfer through individual frames transmitted in serial fashion. An HD audio protocol may use the same audio data interface as the AC-Link but is capable of handling multiple channels or streams in each direction.

The system 200 may also include bus controller 212 coupled to the chipset 220 and coupled to the audio buffer control 230 via a memory/peripheral bus 224. The bus controller 212 may be a high speed serial or parallel bus device, for example, a peripheral component interconnect (PCI) bus controller. The bus controller 212 may provide audio data to the audio buffer control 230 over the memory/peripheral bus 224 using an alternate serial PCM audio data protocol or format (e.g., other than AC '97 or HD Audio). The audio buffer control 230 may be capable of shifting to an alternate audio data interface mode in which the audio buffer control 230 receives audio data transmitted using an alternate serial PCM audio data protocol or format. The audio buffer control 230 may be shifted to the alternate audio data interface mode, for example, in response to a general purpose input/output (GPIO) signal 226. The audio buffer control 230 may also be shifted to the alternate audio data interface mode, for example, using a serial bus control interface, such as an I²C interface, as a configurable control interface.

In one embodiment, the audio buffer control 230 may be coupled to the audio codec 240 using a similar digital audio serial interface 232 to transfer the buffered audio data streams and control data received from the audio controller in the chipset 220. The digital audio serial interface 232 may provide a clock signal (B_BITCLK), a reset signal (B_RST#), a frame synchronization signal (B_SYNC), a serial data out signal (B_SDATAOUT), and a serial data in signal (SDATAIN).

The audio codec 240 may include circuitry to convert the digital audio data into one or more analog audio outputs and optionally one or more digital audio outputs. The audio codec 240 may be capable of converting the audio data in accordance with one or more protocols to support one or more serial audio data interface modes. One example of the audio codec 240 may comply with the AC '97 Specification. Another example of the audio codec 240 may comply with the HD Audio Specification.

An audio device 250 may be coupled to the audio codec 240, for example, using an analog audio connection 242. The audio device 250 may include, for example, an amplifier 252 to amplify an analog audio signal output from the audio codec 240 and one or more speakers 254 to convert the analog audio signal into sound.

Figure 3:
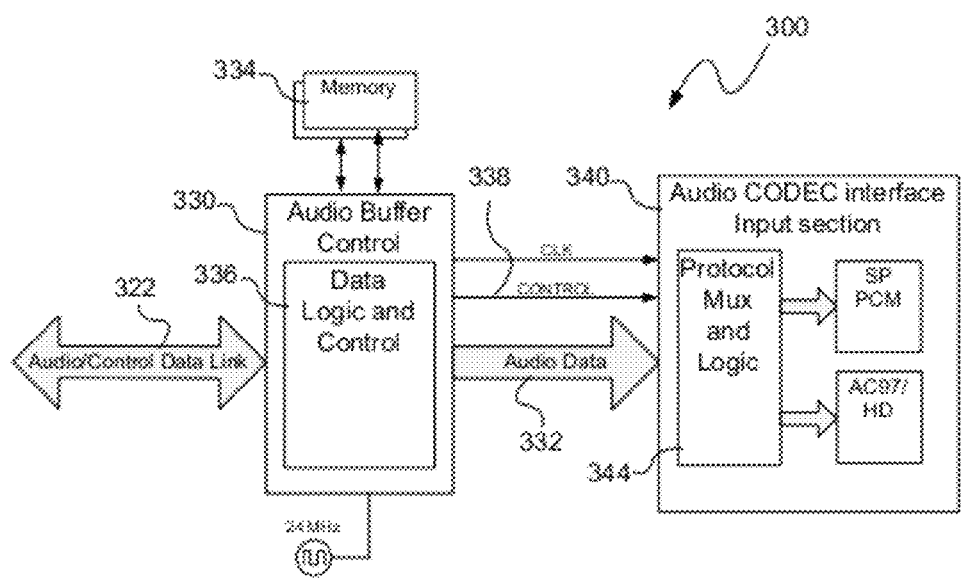
FIG. 3 is a schematic view of an apparatus for buffering audio data and transferring buffered audio data to an audio codec in different audio data interface modes, consistent with a further embodiment of the present disclosure.

Referring to FIG. 3, another embodiment of a buffered codec 300 may include an audio buffer control 330 coupled to one or more memory devices 334 and to an audio codec interface input section 340. An audio data/control link 322 may provide one or more audio data streams including audio data and/or control signals to the audio buffer 330, for example, from an audio controller in a chipset and/or from a bus controller, as described above. The audio buffer control 330 may transfer the buffered audio data 332 to the audio codec interface input section 340 by writing and reading the audio data to and from the memory device(s) 334.

In this embodiment, the audio buffer control 330 may also include circuitry 336 configured to control the transfer of buffered data in different audio data interface modes. In one audio data interface mode, for example, the audio buffer control 330 may transfer buffered audio data and/or control signals using an existing audio data link interface (e.g., AC '97 or HD audio). In an alternate audio data interface mode, the audio buffer control 330 may transfer buffered audio data and/or control signals using an alternate serial PCM interface that provides audio data and control signals using some other serial PCM protocol (e.g., I$^2$S, Left Justified, and Right Justified). In one embodiment, the circuitry 336 may be configured to shift the audio buffer control 330 to the alternate audio data interface mode in response to a mode shift signal or one or more control signals (e.g., using the GPIO(s) in FIG. 2) indicating that the processing system has transitioned to a low power state. The alternate interface mode may thus be an audio data interface mode that provides fewer audio channels and requires less control and signaling and thus less power.

In this embodiment, the audio codec interface input section 340 may support the multiple interface modes (e.g., AC '97, HD audio, or the other serial audio PCM interface) to allow conversion of the audio data transferred from the audio buffer control 330. The audio codec interface input section 340 may include circuitry 344 capable of signaling in accordance with the different protocols corresponding to the audio data interface modes. One or more control signals 338 (e.g., direct bit control or serial interface) may be used to indicate the interface mode or protocol associated with the audio data being transferred by the audio buffer control 330. In response to the control signal(s) 338, the circuitry 344 may use signaling logic corresponding to the audio data interface mode and protocol being used. If the control signal(s) 338 indicate a default audio data interface mode, for example, the circuitry 344 may use signaling logic compatible with the default protocol (e.g., AC 97 or HD Audio). If the control signal(s) 338 indicate an alternate audio data interface mode, for example, the circuitry 344 may use signaling logic compatible with the alternate serial PCM audio data protocol.

Figure 4:
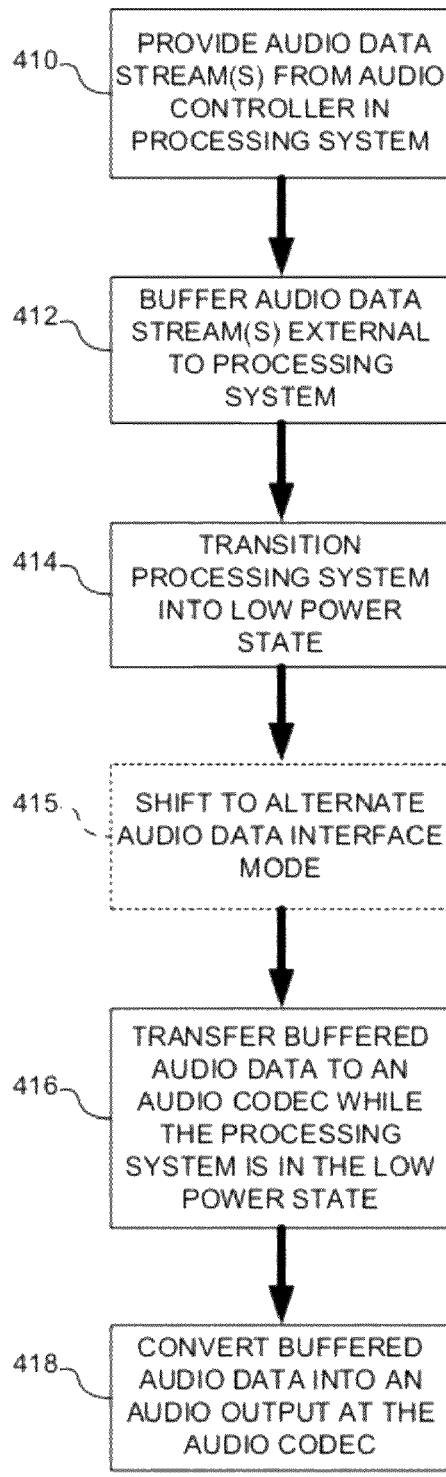
FIG. 4 is a flow chart illustrating one method of buffering audio data to allow low power states during audio playback, consistent with one embodiment of the present disclosure.

FIG. 4 shows one embodiment of a method of buffering audio data to allow a low power state in a processing system during audio playback. According to the method, an audio controller in a processing system may provide 410 one or more audio data streams, for example, as described above. The audio data streams may include audio data for one or more audio channels and the associated control signals used by the protocol associated with the audio data stream. The audio data stream(s) may be buffered 412 external to the processing system, for example, using an audio buffer described above. Audio data may be buffered for any type of audio playback under any type of conditions. Audio data may also be buffered only for certain types of audio playbacks and/or under certain conditions (e.g., for certain power configurations).

The processing system may transition 414 into a low power state when certain conditions are met, for example, when one or more components of the processing system are inactive. In one embodiment, the processing system (or at least the components of the processing system that are active during audio playback) may not transition to a low power state until the processing system has stopped processing audio data. Because the audio data stream(s) processed by the processing system are buffered external to the processing system, the processing system may stop processing audio data sooner (e.g., before the audio codec has finished converting the audio data into an audio output). Thus, the processing system may be able to transition to a low power state sooner.

While the processing system is in the low power state, any buffered audio data may be transferred 416 to the audio codec, for example, as described above. The audio codec may thus continue with an audio playback of the buffered audio data even though the processing system has already transitioned to the low power state. Optionally, the method may also include shifting 415 to an alternate audio data interface mode. In the alternate audio data interface mode, the audio data transmitted using the alternate serial PCM protocol is transferred 416 to the audio codec.

The audio codec converts 418 the buffered audio data into one or more audio outputs (e.g., an analog audio output) at the audio codec. For example, the audio codec may convert the buffered audio data into multiple channels (e.g., left channel, right channel, etc.) of digital data using the appropriate protocol and may convert the digital data in each of the channels into an analog audio data output. If the method shifts 415 to an alternate audio data interface mode, the audio codec may use an alternate serial PCM audio data protocol corresponding to the alternate audio data interface mode.

Figure 5:
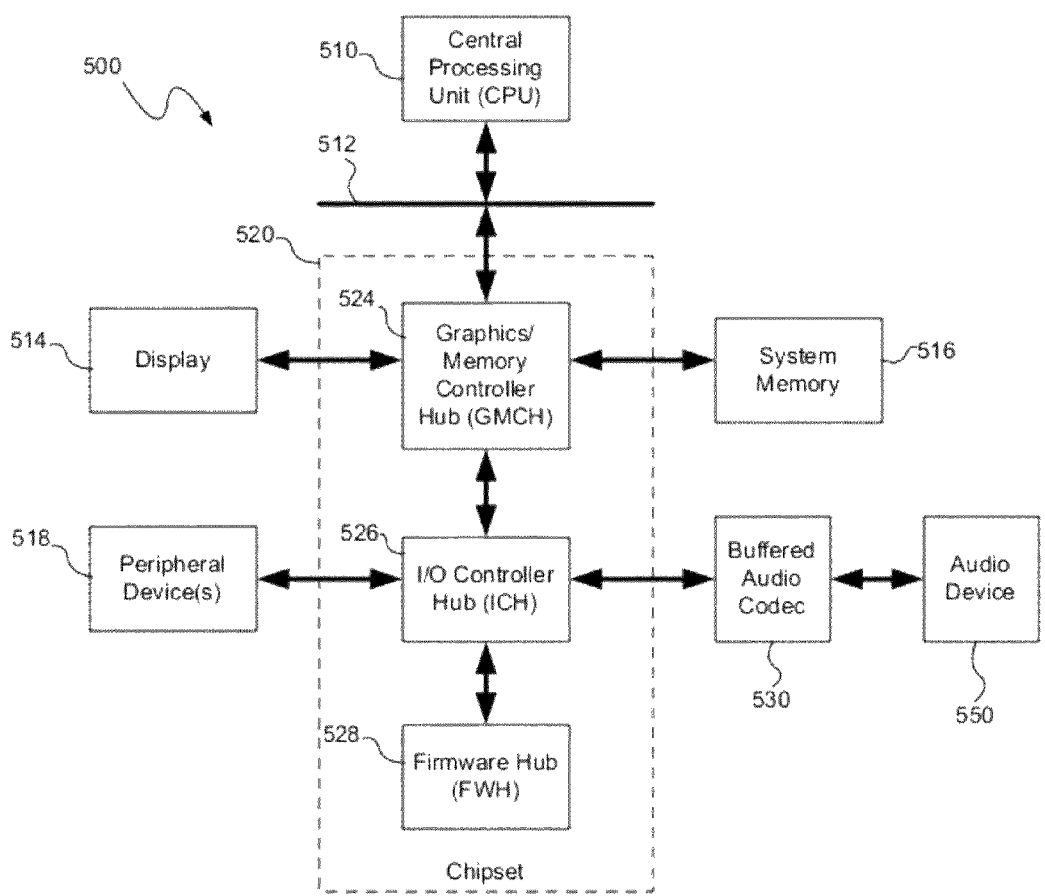
FIG. 5 is a schematic view of a computer system for buffering audio data to allow low power states during audio playback, consistent with yet another embodiment of the present disclosure.

As shown in FIG. 5, a computer system 500, consistent with one embodiment, may include a system for buffering an audio data stream to allow low power states. The computer system 500 may include one or more central processing units (CPUs) 510 and a chipset 520 coupled to a system bus 512. The CPU 510 may include, for example, any type of Intel® processor. One embodiment of the chipset 520 may include a memory controller hub (MCH) or a graphics and memory controller hub (GMCH) 524, an input/output (I/O) controller hub (ICH) 526, and a firmware hub (FWH) 528.

The MCH or GMCH 524 may be coupled to a display 514 and/or a system memory 516. The ICH 526 may be coupled to one or more peripheral devices 518, for example, via a peripheral bus such as a component interconnect (PCI) bus or PCI Express bus. The ICH 526 may also be coupled to a buffered audio codec 530, according to any of the embodiments described above, which buffers audio data to allow low power states during audio playback. An audio device 550, such as speakers, may be coupled to the audio codec 530. The audio device 550 may be integrated into a device (e.g., a computer or audio player with built-in speakers) or may be coupled to a device (e.g., speakers or headphones coupled to a computer or audio player).

The computer system 500 may be implemented in a desktop computer, a mobile computer, a handheld computer, or other consumer electronic device (e.g., a digital media player). Audio data may also be buffered for other types of processing systems having other architectures. For example, the buffered audio codec 530 may be coupled to an audio controller that is not incorporated into a chipset.

Consistent with one embodiment, an apparatus may include an audio buffer control configured to be coupled to an audio controller in a processing system and configured to control buffering of at least one audio data stream received from the audio controller in the processing system. The apparatus may also include an audio codec coupled to the audio buffer. The audio codec may be configured to receive buffered audio data stream transferred from the audio buffer and to convert the buffered audio data stream into at least one audio output. The audio buffer control may also be configured to transfer the buffered audio data stream to the audio codec independent of a low power state of the processing system.

Consistent with another embodiment, a system may include a processing system including an audio controller configured to control at least one audio data stream. The processing system may have a plurality of power states including at least one low power state. The system may also include an audio buffer coupled to the audio controller and external to the processing system. The audio buffer may be configured to receive and buffer the at least one audio data stream from the audio controller. The system may further include an audio codec coupled to the audio buffer. The audio codec may be configured to receive buffered audio data stream transferred from the audio buffer and to convert the buffered audio data stream into at least one audio output. The audio buffer may be configured to transfer the buffered audio data stream to the audio codec independent of the at least one low power state.

Consistent with a further embodiment, a method may include: providing at least one audio data stream from an audio controller in a processing system; buffering the at least one audio data stream external to the processing system; transitioning the processing system to a low power state; transferring buffered audio data stream to an audio codec while the processing system is in the low power state; and converting the buffered audio data stream into at least one audio output at the audio codec.

Consistent with yet another embodiment, a system may include a system bus, a processor coupled to the system bus, and a chipset coupled to the system bus. The chipset may include a graphics and memory controller hub and an I/O controller hub configured to control an audio data stream. The system may also include a system memory coupled to the graphics and memory controller hub and a buffered audio codec coupled to the I/O controller hub. The buffered audio codec may include an audio buffer control configured to be coupled to the I/O controller hub and configured to control buffering of the audio data stream received from the I/O controller hub; at least one memory coupled to the audio buffer control and configured to store buffered audio data stream temporarily; and an audio codec coupled to the audio buffer. The audio codec may be configured to receive the buffered audio data stream transferred from the audio buffer and to convert the audio data stream into at least one audio output. The audio buffer control may also be configured to transfer the buffered audio data stream to the audio codec independent of a low power state of the processing system. The system may further include an audio device coupled to the buffered audio codec and configured to receive the at least one audio output and convert the at least one audio output into sound.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an audio buffer control operative to control buffering of at least one audio data stream received from an audio controller in a processing system, the buffering occurring external to the processing system; and
an audio codec coupled to the audio buffer, the audio codec operative to receive the at least one buffered audio data stream from a buffer external to the processing system when the processing system is in a low power state and to convert the at least one buffered audio data stream into at least one audio output.

2. The apparatus of claim 1, the audio buffer control comprising circuitry operative to control the buffering of the at least one audio data stream in accordance with multiple audio data interface modes.

3. The apparatus of claim 2, the audio codec comprising circuitry operative to convert the buffered audio data stream into the at least one audio output in accordance with multiple protocols corresponding to the multiple audio data interface modes.

4. The apparatus of claim 3, the circuitry in the audio buffer control operative to shift to one of the multiple audio data interface modes in response to the processing system transitioning to the low power state.

5. The apparatus of claim 3, the audio data interface modes comprising a serial pulse code modulation (PCM) interface mode, the circuitry in the audio buffer control operative to shift to the PCM interface mode in response to the processing system transitioning to the low power state.

6. The apparatus of claim 5, the audio data interface modes comprising an audio interface mode based on audio codec 97 (AC97) audio or high definition (HD) audio.

7. The apparatus of claim 1, the audio buffer control and the audio codec integrated on or as part of a single integrated circuit.

8. The apparatus of claim 1, the at least one audio output comprising at least one analog audio output.

9. The apparatus of claim 1, comprising:
at least one memory device coupled to the audio buffer control.

10. The apparatus of claim 1, the audio buffer control operative to transfer the buffered audio data stream to the audio codec independent of a low power state of the processing system.

11. A system, comprising:
a processing system comprising an audio controller configured to control at least one audio data stream, the processing system comprising a plurality of power states including at least one low power state;
an audio buffer coupled to the audio controller and external to the processing system, the audio buffer being configured to receive and buffer the at least one audio data stream from the audio controller; and
an audio codec coupled to the audio buffer, the audio codec operative to receive the at least one buffered audio data stream transferred from the audio buffer while the processing system is in the at least one low power state and to convert the buffered audio data stream into at least one audio output.

12. The system of claim 11, the audio buffer comprising circuitry operative to control the buffering of the audio data stream in accordance with multiple audio data interface modes.

13. The system of claim 12, the audio codec comprising circuitry operative to convert the at least one buffered audio data stream into the at least one audio output in accordance with multiple protocols corresponding to the multiple audio data interface modes.

14. The system of claim 13, the audio data interface modes comprising a serial pulse code modulation (PCM) interface mode, the circuitry in the audio buffer control operative to shift to the PCM interface mode in response to the processing system transitioning to the low power state.

15. The system of claim 11, comprising:
a bus controller coupled to the audio buffer.

16. A computer-implemented method, comprising:
providing at least one audio data stream from an audio controller in a processing system;

buffering the at least one audio data stream external to the processing system;

transitioning the processing system to a low power state;

transferring the at least one buffered audio data stream to an audio codec while the processing system is in the low power state; and converting the buffered audio data stream into at least one audio output.

17. The computer-implemented method of claim 16, the audio output comprising an analog audio output.

18. The computer-implemented method of claim 16, providing the audio data stream from the audio controller in accordance with an audio data interface mode; and shifting to an alternate audio data interface mode when the processing system is in the low power state.

19. The computer-implemented method of claim 18, the audio data interface mode is based on either audio codec 97 (AC97) or a high definition (HD) audio.

20. The computer-implemented method of claim 19, the alternate audio data interface mode comprising a serial audio PCM interface mode.

* * * * *

UNITED STATES PATENT AND TRADEMARK OFFICE
CERTIFICATE OF CORRECTION

PATENT NO. : 8,285,557 B2  
APPLICATION NO. : 12/857687  
DATED : October 9, 2012  
INVENTOR(S) : Pradeep Sebestian et al.

Page 1 of 1

It is certified that error appears in the above-identified patent and that said Letters Patent is hereby corrected as shown below:

In the Specifications:

In column 1, line 12, delete "AUDIODATA" and insert -- AUDIO DATA --, therefor.

In the Claims:

In column 10, line 4, in claim 19, after "mode" delete "is".

Signed and Sealed this  
Fifteenth Day of January, 2013

David J. Kappos  
*Director of the United States Patent and Trademark Office*